(12) United States Patent
Jiandong

(10) Patent No.: US 11,339,040 B2
(45) Date of Patent: May 24, 2022

(54) HANDLE HEAD FOR AN ELECTRIC TRANSPORT VEHICLE

(71) Applicant: Zhejiang E-P Equipment Co., Ltd., Hangzhou (CN)

(72) Inventor: Yu Jiandong, Hangzhou (CN)

(73) Assignee: ZHEJIANG E-P EQUIPMENT CO., LTD.

( * ) Notice: Subject to any disclaimer, the term of this patent is extended or adjusted under 35 U.S.C. 154(b) by 700 days.

(21) Appl. No.: 16/386,737

(22) Filed: Apr. 17, 2019

(65) Prior Publication Data

US 2019/0322507 A1   Oct. 24, 2019

(30) Foreign Application Priority Data

Apr. 19, 2018   (CN) .......................... 201820564034.7

(51) Int. Cl.
  *B66F 9/075*   (2006.01)
  *B62B 5/06*   (2006.01)
  *B66F 9/24*   (2006.01)

(52) U.S. Cl.
  CPC ............. *B66F 9/0759* (2013.01); *B62B 5/063* (2013.01); *B66F 9/07568* (2013.01); *B66F 9/07572* (2013.01); *B66F 9/24* (2013.01)

(58) Field of Classification Search
  CPC ............... B66F 9/0759; B66F 9/07572; B66F 9/07568; B66F 9/24; B66B 5/0069; B66B 5/063
  See application file for complete search history.

(56) References Cited

U.S. PATENT DOCUMENTS

| | | | | |
|---|---|---|---|---|
| 7,198,132 B2* | 4/2007 | Gerbier | ..................... | B62B 5/06 180/333 |
| 7,237,645 B2* | 7/2007 | Lohmann | .................. | B62B 5/06 180/332 |
| 7,325,655 B2* | 2/2008 | Lohmann | ................. | B62D 1/14 180/315 |
| 8,413,947 B2* | 4/2013 | Chiang | ................. | H01M 50/20 206/703 |
| 8,467,937 B2* | 6/2013 | Hanna | .................. | B62D 5/0418 180/332 |
| 9,376,299 B2* | 6/2016 | Hoffman | ................ | B62B 5/0033 |
| 9,421,963 B2* | 8/2016 | Wetterer | ................. | B66F 9/075 |
| 9,586,605 B2* | 3/2017 | He | ......... | B62B 3/0612 |
| 9,718,661 B1* | 8/2017 | Hoffman | ................... | B62B 3/06 |
| D801,616 S * | 10/2017 | Qichen | ......................... | D34/28 |
| 9,966,712 B1* | 5/2018 | Hongpeng | ........... | H01R 13/052 |
| 10,173,709 B2* | 1/2019 | Zheng | ..................... | B62B 5/067 |
| 10,233,064 B2* | 3/2019 | Hoffman | ................ | B62B 5/0069 |
| 10,538,422 B2* | 1/2020 | Lijian | ....................... | B66F 9/24 |
| 10,730,728 B1* | 8/2020 | Qichen | ................. | H01M 50/20 |
| 10,787,351 B2* | 9/2020 | Lili | ...................... | B66F 9/07531 |
| 10,836,620 B2* | 11/2020 | Jiandong | .................. | B62D 1/14 |

(Continued)

*Primary Examiner* — Michael A Riegelman
(74) *Attorney, Agent, or Firm* — Cook Alex Ltd.

(57) ABSTRACT

A handle head of an electric transport vehicle includes a first body and a second body, with the second body being releasably connected to the first body. The second body conveniently may be disassembled from the first body when the vehicle is going to be shipped, and then reassembled for use of the vehicle. Disassembly of the second body from the first reduces the length of the handle and the volume of the handle head that otherwise need to be accommodated during shipping.

13 Claims, 3 Drawing Sheets

(56) References Cited

U.S. PATENT DOCUMENTS

| | | | |
|---|---|---|---|
| 11,167,967 B2* | 11/2021 | Hoffman | B66F 9/065 |
| 11,214,471 B2* | 1/2022 | Rusche | B62B 5/04 |
| 11,274,021 B2* | 3/2022 | Standard | B66F 9/0755 |
| 2007/0137904 A1* | 6/2007 | Rose | B66F 9/24 |
| | | | 180/19.1 |
| 2014/0195127 A1* | 7/2014 | Hoffman | B66F 9/0755 |
| | | | 701/50 |
| 2015/0102274 A1* | 4/2015 | He | B66F 9/08 |
| | | | 254/2 C |
| 2015/0266543 A1* | 9/2015 | Marioni | B60L 50/51 |
| | | | 180/207.3 |
| 2017/0267506 A1* | 9/2017 | Frei | B66F 9/20 |
| 2018/0009643 A1* | 1/2018 | Hoffman | B62B 3/0612 |
| 2019/0322507 A1* | 10/2019 | Jiandong | B66F 9/20 |
| 2019/0322508 A1* | 10/2019 | Lili | B66F 9/07531 |
| 2019/0322509 A1* | 10/2019 | Jianming | B62B 3/0618 |
| 2019/0322510 A1* | 10/2019 | Lijian | H05K 5/03 |
| 2020/0331733 A1* | 10/2020 | Jiandong | B66F 9/07568 |

* cited by examiner

HANDLE HEAD FOR AN ELECTRIC TRANSPORT VEHICLE

CROSS-REFERENCE TO RELATED APPLICATION

This application claims priority to Chinese Patent Application No. 201820564034.7, filed Apr. 19, 2018, which is hereby incorporated by reference in its entirety.

TECHNICAL FIELD

The invention relates to a material handling equipment, and more particularly to electric transport vehicles, such as pallet trucks, and to a handle head for an electric transport vehicle.

BACKGROUND

Electric transport vehicles, such as pallet trucks, are used as logistics equipment to carry goods. In the prior art, Chinese utility model patent having publication number CN204897324U discloses an electric transport vehicle handle, commonly otherwise referred to as a handle head, that includes a handle body, and two sides of the handle body are provided with holding or gripping parts for hand support. A control panel and key start switch are installed on the handle body and electrically connected to an electronic control box on the handle body. The control panel is equipped with an electric display screen, a time display screen and a signal lamp. Thus, functions are centralized on the handle body for easy operation and pre-installation assembly.

However, because of the large volume and heavy weight of the handle head in CN204897324U, it is not convenient to transport the vehicle, after a handle arm and handle head have been assembled to the vehicle. For patented handles of electric vehicles, such as in CN204897324U, the handle body may include a front grip part that can be disassembled from a rear grip part, but this has little effect on reducing the handle length or volume of the handle head when transporting the vehicle.

SUMMARY

One of the purposes of this disclosure is to provide for an electric transport vehicle a handle head that permits convenient disassembly prior to transportation or shipping of the vehicle. This may be experienced by permitting quick and convenient disassembly and installation of a portion of a handle head, resulting in a shorter handle length and smaller handle volume for transportation.

In order to achieve the above purpose, the disclosure provides a handle head of an electric transport vehicle, such as a pallet truck, that includes a first body and a second body, which can be rapidly disassembled or assembled to each other. A lower end of the first body is connected to a handle arm. The first body is provided with gripping parts or holding portions for hand support. The holding portions are on the left and right sides of the first body, and bend symmetrically toward the middle, with an installation space defined by and between the holding portions. A lower end of a middle part of the first body receives and is fixed to a handle arm.

The second body is installed in the installation space between the left and right sides of the first body. The second body includes a mounting bracket and a control circuit board is mounted on the mounting bracket. A pin connector is fixed at the bottom of the mounting bracket, and a plurality of pins are arranged on the pin connector. The circuit board is electrically connected to the pin connector. The pin connector corresponds and connects to an electric connection seat on the first body. The first body and the second body are respectively provided with a positioning guide column and a positioning seat, with the positioning seat receiving the respective positioning guide column. Also, the first body and the second body are connected by fasteners at the connection of the positioning guide column and the positioning seat.

In the preferred embodiment, the mounting bracket of the second body is provided with a display screen connected with the control circuit board, a forward rotary button, a backward rotary button, a slow speed button, a lifting button, an emergency reverse switch button and a horn button.

Also, in the preferred embodiment, the mounting bracket includes a middle bracket portion and left and right side bracket portions. The control circuit board is installed on the middle bracket portion. The forward and backward rotary buttons are located on the left and right side bracket portions of the mounting bracket. The display screen and the horn button are located on the front of the middle bracket portion, the slow speed button is located on the back of the middle bracket portion, and the emergency reverse switch button is located on a top of the middle bracket portion. The lifting button is arranged on the left and right side racks.

Still further, in the preferred embodiment, the installation structure of the horn button is similar to that of the slow speed button. Both of them include contact switch buttons and switch panels. The contact switch buttons are arranged on the control circuit board on the middle bracket portion. The switch panels are provided with an extension plate, which articulates relative to the middle bracket portion so as to rotate and permit the switch panels to engage and depress the contact switch buttons, respectively. The switch panels are equipped with resilient members that extend toward and engage one side of the middle bracket portion, respectively. When a user presses the switch panel, the resilient member deforms and after releasing the switch panel, the resilient member biases the switch panel to move away from contact switch button.

The vehicle of the disclosure includes a handle head of the electric transport vehicle as described with any of the above items.

An electric transport vehicle and its ha head of the disclosure provide for the handle head to be divided into two parts, namely, the first body and the second body, which can be conveniently disassembled and assembled. In light of this, the first and second bodies of the handle head can be separated from each other when the vehicle needs to be transported, thus reducing the length of the handle and volume of the handle head when it is transported. Given the typical extension of a handle head and handle arm, this advantageously facilitates transportation of the vehicle. Also, the first body and the second body can be pre-assembled separately, and then the first body and the second body of the handle head can be connected electronically through the electrical connection seat and the pin connector, so as to realize the electrical connection between the handle head and the electronic control assembly of the vehicle. The first body and the second body can be mechanically fixed by at least one fastener, and the first body and the second body can be aligned through use of the positioning guide column and positioning seat. The positioning guide column and positioning seat coordination guides and facilitates the connection between the first body and the second body, permitting fast fixing of the first body to the second body.

Figure 1:
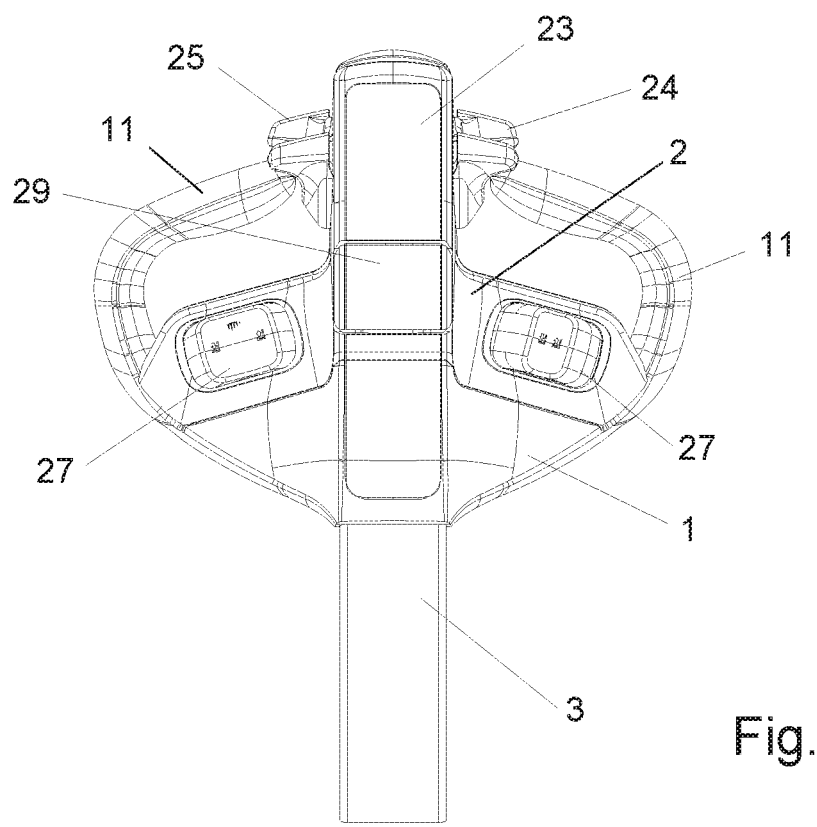
FIG. 1 is a front schematic diagram of a handle head in accordance with the present disclosure.

A list of structures and features identified within the application drawings and discussed herein includes: a handle head H, first body 1, second body 2, handle arm 3, holding portion 11, installation space 12, electrical connection seat 13, positioning guide column 14, mounting bracket 21, middle bracket portion 211, pin connector 22, display screen 23, forward rotary button 24, backward rotary button 25, slow speed (tortoise) button 26, contact switch button 261, switch panel 262, extension plate 2621, resilient member 2622, lifting button 27, emergency reverse switch button 28, and horn button 29.

DETAILED DESCRIPTION OF THE PREFERRED EMBODIMENT

An embodiment of a handle head for an electric transport vehicle, such as a pallet truck, is described in detail below, and an example of the embodiment is shown in the drawings in which identical or similar labels throughout represent identical or similar elements, or elements with the same or similar functions. The following embodiments described with reference to the drawings are illustrative and are intended to be used to explain, rather than to limit the disclosure.

Figure 2:
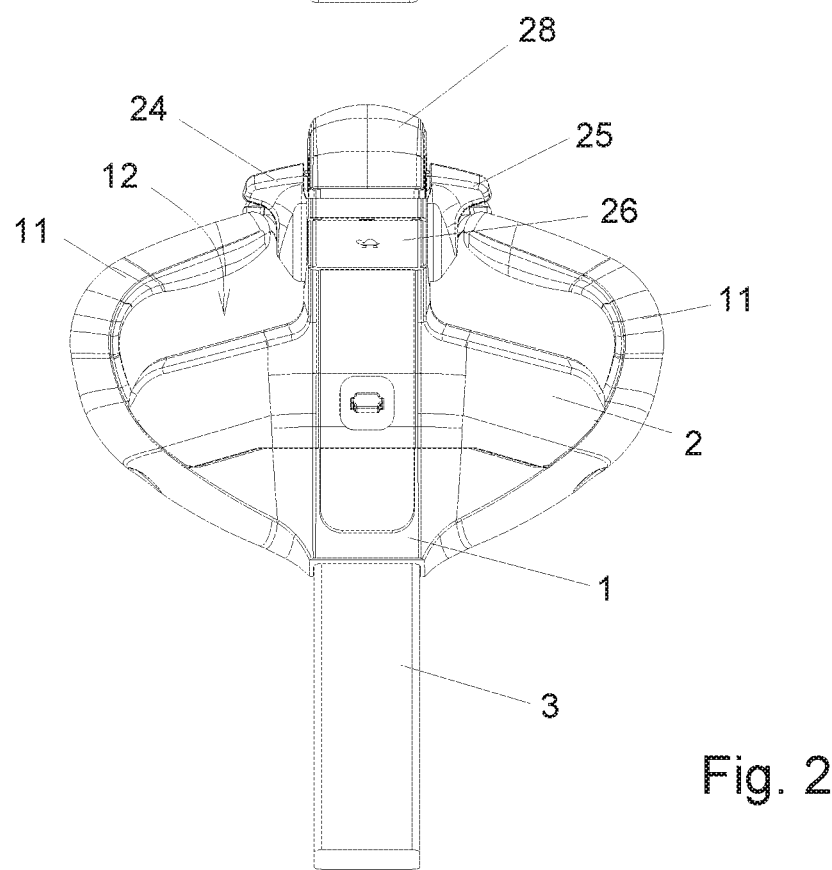
FIG. 2 is a rear schematic diagram of the handle head in accordance with the present disclosure.
Figure 3:
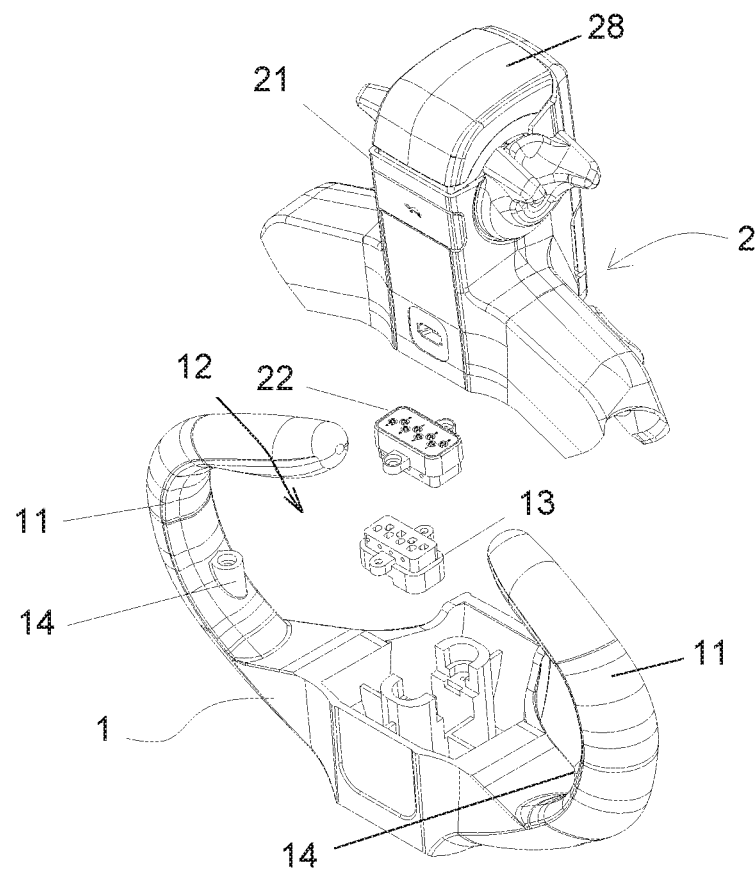
FIG. 3 is a rear exploded schematic diagram of the handle head in accordance with the present disclosure.

A handle head H for an electric transport vehicle, such as an electric pallet truck, is shown in FIGS. 1-3. The handle head H presents a handle head and includes a first body 1 and a second body 2 which can be releasably connected to the first body 1. A lower end of the first body 1 receives and is connected to an upper end of a handle arm 3, which may for example be of rigid tubular construction.

Left and right sides of the first body 1 provide hand supports at hand gripping or holding portions 11. The holding portions 11 bend symmetrically toward each other and in the direction of a middle of the handle head H. An installation space 12 is defined by and between the holding portions 11. At least one positioning guide column 14 extends from the first body 1 into the installation space 12. Preferably, symmetrically arranged on the handle head H and extending from each holding portion 11 into the installation space 12 are respective positioning guide columns 14.

Fixed to the middle part of the first body 1 is an upward extending electric connection seat 13, which houses a plurality of electric contacts. The electric connection seat 13 is connected by wires to a vehicle electronic control assembly mounted elsewhere on the vehicle. The electronic connection seat 13 is arranged in the installation space 12, between the left and right holding portions 11.

The second body 2 is mounted to the first body 1 in the installation space 12 between the left and right holding portions 11. The second body 2 includes a mounting bracket 21 and a control circuit board is mounted on the mounting bracket 21. A pin connector 22 is fixed at the bottom of the mounting bracket 21, and a plurality of electrical contact pins are arranged on the pin connector 22. The control circuit board is electrically connected with the pin connector 22.

The pin connector 22 that is connected to the second body 2 corresponds and connects to the electrical connection seat 13 connected to the first body 1, and the pin connector 22 and the electrical connection seat 13 are connected together to realize connection of the handle head H to a control circuit board on the mounting bracket 21 and to the vehicle electronic control assembly. The second body 2 also is provided with at least one positioning seat that is configured to receive a respective at least one positioning guide column 14 on the first body 1. The positioning guide column 14 on the first body 1 preferably is received by a positioning seat on the second body 2. The first body 1 and the second body 2 are connected by fasteners, such as screws, bolts or other anchors, at the connections of the positioning guide columns and the positioning seats. Positioning of the electric connection seat 13 and pin connector 22 is facilitated by use of the positioning guide column 14 and positioning seat when connecting the first body 1 and the second body 2, such that the pins of the pin connector 22 are aligned with the electric contacts in the electrical connection seat 13.

A display screen 23 is connected with the control circuit board on the mounting bracket 21. Additionally connected to the second body 2 are controls including a forward rotary button 24, a backward rotary button 25, a slow speed button 26, a lifting button an emergency reverse switch button 28 and a horn button 29. The mounting bracket 21 of the present embodiment includes an upstanding middle bracket portion 211 and left and right side bracket portions. The middle bracket portion 211 and the left and right side bracket portions can be connected and fixed together or can be formed as an integral structure. The control circuit board is installed on the middle bracket portion 211, while the forward rotary button 24 and the backward rotary button 25 are located on the respective left and right side bracket portions of the mounting bracket 21. The display screen 23 and the horn button 29 are located on a front of the middle bracket portion 211, the slow speed button 26 is located on a back of the middle bracket portion 211, and the emergency reverse switch button 28 is located on a top of the middle bracket portion 211.

Figure 4:
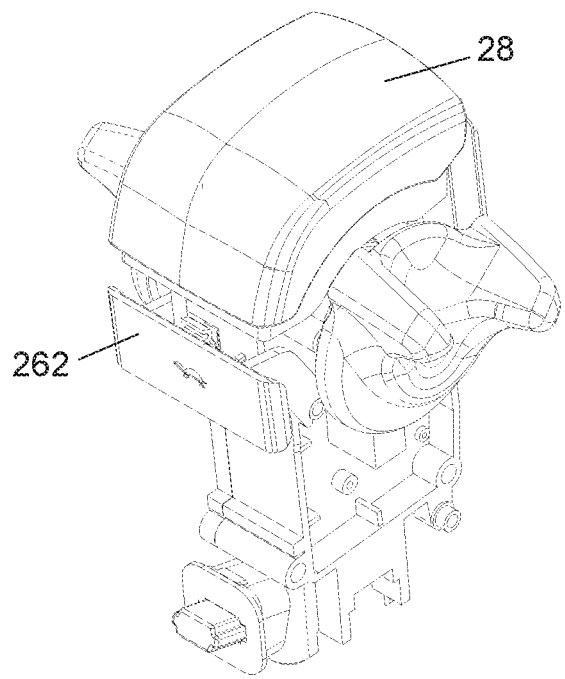
FIG. 4 is a rear schematic diagram of a switch panel installed on a middle bracket portion of the handle head in accordance with the present disclosure.
Figure 5:
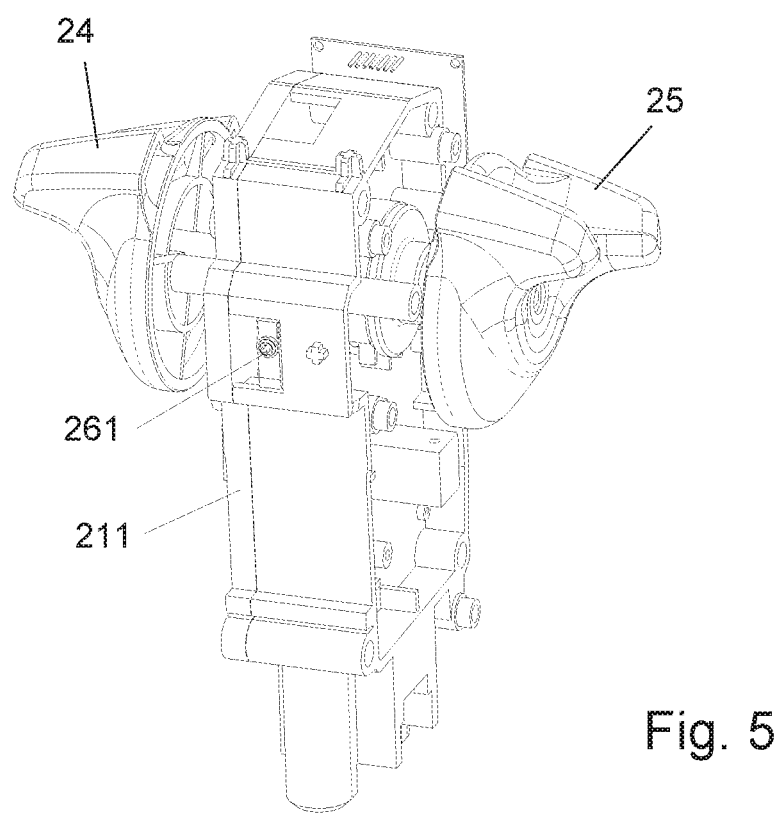
FIG. 5 is a rear schematic diagram of the of the middle bracket portion of the handle head in accordance with the present disclosure.
Figure 6:
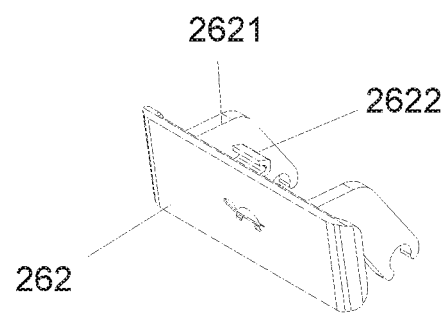
FIG. 6 is a rear schematic diagram of a switch panel of the handle head in accordance with the present disclosure.

Installation of the slow speed button 26 is shown in FIGS. 4-6, and it will be appreciated that the installation structure of the horn button 29 is similar to that of the slow speed button 26, including use of a contact switch button 261 on the middle bracket portion 211 of the mounting bracket 21 and a switch panel 262. The contact switch button 261 is set on the control circuit board, and the switch panel 262 is provided with an extension plate 2621 which articulates or moves relative to the middle bracket portion 211. The switch panel 262 can rotate to engage the contact switch button 261 by an articulating movement of the switch panel 262 relative to the middle bracket portion 211.

A resilient member 2622 extends from one side of the switch panel 262 in a direction toward the middle bracket portion 211, which is the same direction as the switch panel 262 is pressed toward the contact switch button 261. When the switch panel 262 is pressed, the resilient member 2622 is deformed. When the switch panel 262 is released, the resilience of the resilient member 2622 causes the switch panel 262 to no longer press the contact switch button 261 and biases the switch panel 262 to a ready position. The extension plate 2621 can be configured to be fixed and permit flexing, or can permit translation or be hinged to provide movement of the extension plate 2621 relative to the middle bracket portion 211. It will be appreciated that a limit block or other structure also may be used to set a limit for the activation range of the switch panel 262. By installing the horn button 29 and the slow speed button 262 according to the above structure, the distance the horn button 29 and the slow speed button 26 project outward can be reduced, and the overall aesthetics of the handle head can be improved. The lifting button 27 is set on left and right side front portions of the second body 2. The lifting button 27 may be divided into two independent settings, such as a lifting button and a lowering button. The lifting button also may be set as a rotary dial button which integrates the two functions of lifting and lowering.

It will be appreciated that the handle head of the disclosure may be used on an electric pallet truck or other suitable material handling vehicle. Also, it should be noted that the above embodiment is only a representative example of a handle head of the present disclosure which may have many different configurations. Any equivalent to or modification of the above embodiment according to the essence of the disclosure shall be considered to be within the scope of the disclosure.

The invention claimed is:

1. A handle head of an electric transport vehicle, comprising:
   a first body and a second body, with the second body being releasably connected to the first body;
   a lower end of the first body is configured to receive and connect to an upper end of a handle arm;
   left and right sides of the first body further comprise left and right holding portions to be grasped and which bend symmetrically toward each other;
   and installation space is defined by and between the left and right holding portions, and the second body is releasably connected to the first body in the installation space;
   an electric connection seat is connected to the first body and faces the installation space;
   the second body further comprises a mounting bracket;
   an electric connector is fixed to the bottom of the mounting bracket; and
   the electric connection seat connected to the first body electrically connects to the electric connector connected to the mounting plate of the second body when the second body is connected to the first body in the installation space.

2. The handle head of an electric transport vehicle in accordance with claim 1, wherein the electric connector fixed to the bottom of the mounting bracket of the second body is a pin connector and includes a plurality of pins arranged on the pin connector and the electric connection seat connected to the first body and facing the installation space includes a plurality of electric contacts, and the plurality of pins of the pin connector electrically connect to the plurality of electric contacts of the electric connection seat when the second body is connected to the first body.

3. The handle head of an electric transport vehicle in accordance with claim 1, wherein the first body further comprises at least one positioning guide column and the second body further comprises at least one respective positioning seat, wherein the at least one positioning guide column of the first body aligns with the respective at least one positioning seat of the second body when the second body is connected to the first body.

4. The handle head of an electric transport vehicle in accordance with claim 3, wherein the at least one positioning guide and at least one positioning seat assist in guiding connection of the electric connection seat on the first body to the electric connector fixed to the bottom of the mounting plate of the second body.

5. The handle head of an electric transport vehicle in accordance with claim 1, wherein the second body is connected to the first body by at least one fastener.

6. The handle head of an electric transport vehicle in accordance with claim 1, further comprising a display screen, a forward rotary button, a backward rotary button, a slow speed button, a lifting button, an emergency reverse switch button and a horn button are connected to the mounting bracket of the second body.

7. The handle head of an electric transport vehicle in accordance with claim 1, wherein lifting and lowering buttons are located on left and right side portions of the second body.

8. The handle head of an electric transport vehicle in accordance with claim 1, wherein the mounting bracket further comprises a middle bracket portion, a left side bracket portion and a right side bracket portion.

9. The handle head of an electric transport vehicle in accordance with claim 8, wherein a forward rotary button and a backward rotary button are arranged on the respective left and right side bracket portions, and a display screen and a horn button are located on the middle bracket portion.

10. The handle head of an electric transport vehicle in accordance with claim 8, wherein a slow speed button is located on a rear of the middle bracket portion, and an emergency reverse switch button is located on a top of the middle bracket portion.

11. The handle head of an electric transport vehicle in accordance with claim 8, wherein a contact switch button is provided on the middle bracket portion, and a slow speed button further comprises a switch panel that is movably connected to the middle bracket portion and engages the contact switch button when the switch panel is pressed toward the middle bracket portion.

12. The handle head of an electric transport vehicle in accordance with claim 11, wherein the switch panel further comprises a resilient member that biases the switch panel away from pressing the contact switch button when the switch panel is released.

13. The handle head of an electric transport vehicle in accordance with claim 12, wherein a horn button is configured and connected to the middle bracket portion in the same way as the slow speed button.

* * * * *